United States Patent

Enomoto et al.

[11] Patent Number: 5,886,444
[45] Date of Patent: Mar. 23, 1999

[54] ROTARY MACHINE AND MANUFACTURING METHOD THEREFOR

[75] Inventors: Yuji Enomoto; Noriaki Yamamoto; Yukinori Taneda; Hiromichi Hiramatsu, all of Yokohama, Japan

[73] Assignee: Hitachi, Ltd., Tokyo, Japan

[21] Appl. No.: 789,431

[22] Filed: Jan. 29, 1997

[30] Foreign Application Priority Data

Jan. 30, 1996 [JP] Japan .................................. 8-013923

[51] Int. Cl.$^6$ ...................................................... H02K 3/04
[52] U.S. Cl. ......................... 310/208; 310/206; 310/207; 310/179; 310/260
[58] Field of Search ................................... 310/208, 206, 310/200, 207, 179, 260, 261

[56] References Cited

U.S. PATENT DOCUMENTS 2,135,315 11/1938 Walters et al. ............................. 175/21
2,138,292 11/1938 Casale ...................................... 171/206

*Primary Examiner*—Nestor Ramirez
*Assistant Examiner*—Timothy A. Williams
*Attorney, Agent, or Firm*—Antonelli, Terry, Stout & Kraus, LLP

[57] ABSTRACT

The present invention is characterized in that a rotary machine attempts to lower the resistance of each coil and realize improvement of efficiency and miniaturization of a motor by shortening the end portion of a coil to be inserted into a stator, and the constitution thereof is that the coil end portion of a stator coil has a shape that a conductor raised and looped back from a slot provided in the core on the rotor side is closer to the end face of the aforementioned core than a conductor raised and looped back in the aforementioned slot on the opposite side of the rotor, and the aforementioned constitution has a stator coil having a loopback shape passing a location other than above the adjacent slot surface.

The present invention is also a method for manufacturing a rotary machine characterized in that the coil end portion of a stator coil is held horizontally by a holding member, and the holding member is rotated by finely moving the rotational center from the rotor side to the opposite side of the rotor with the slot insertion portion provided in the core restricted, and the aforementioned coil end portion is formed in the loopback shape.

4 Claims, 9 Drawing Sheets

ENLARGED VIEW OF PORTION A

FIG. 2
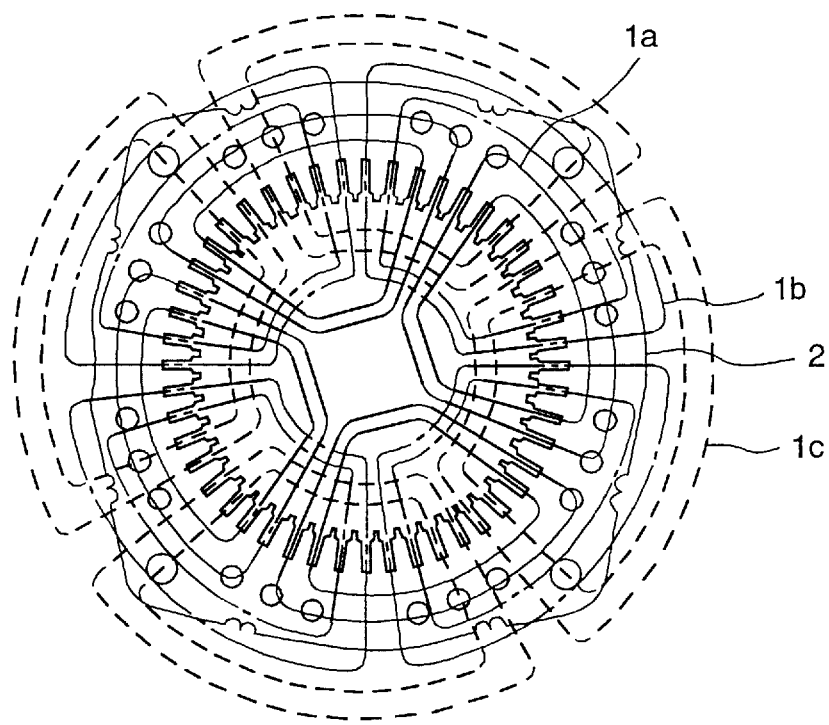
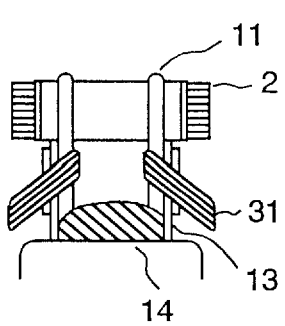
FIG. 3a
PRIOR ART
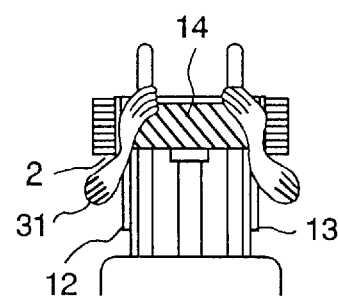
FIG. 3b
PRIOR ART
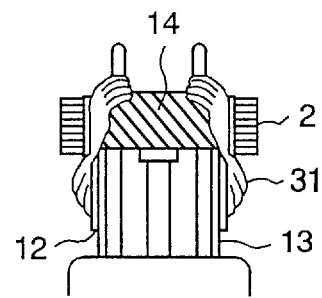
FIG. 3c
PRIOR ART

ROTARY MACHINE AND MANUFACTURING METHOD THEREFOR

BACKGROUND OF THE INVENTION

The present invention relates to a rotary machine of a motor or a generator comprising a rotor and a stator and more particularly to a coil to be inserted into the slot of the stator and a manufacturing method of the coil.

A stator of a motor such as an induction motor or synchronous motor which is a rotary machine comprises a core and coils and as shown in FIG. 2 and the coils are arranged in many slots provided in the core three-dimensionally so as to be overlaid each other. The inserter system for inserting coils for producing the stator into the slots is indicated in, for example, Japanese Patent Application Laid-Open No. 53-100402. In this inserter system, a method for setting a coil 31 wound in the predetermined shape beforehand in a coil guide 11 called a blade as shown in FIGS. 3a–3c, setting a core 2 in the state that a slot insulating material is inserted, pushing up a push-in jig 14 called a stripper and a wedge pusher 12 using hydraulic pressure, and inserting the coil 31 and a wedge 13 into the slot at the same time is used. However, the coil 31 enters inside the slots one by one as it moves in the longitudinal direction of the core, so that an extra length is necessary in the longitudinal direction of the coil itself and it causes an extra length in the end portion of the coil. Namely, since the inserter system inserts the coil by adjusting the shape thereof, there are problems imposed that the winding occupation rate in each slot of the core (a ratio of the cross-sectional area of the magnet wire including the film to the effective area of each slot in which the insulating material is subtracted) cannot be increased and some extra length is necessary in the conductor portion protruded outside the core, that is, in the end coil portion. On the other hand, in the inserter system, in is consideration of the insertion resistance when the coil 1 wound round the blade 11 is pushed up by the stripper 14 and damage to the coil, the fact is that it is necessary to set the winding occupation rate to about 60 to 70% and the end coil length to about ⅓ to ½ of the overall length of the conductor.

In a comparatively large motor, as a manufacturing method for increasing the winding occupation rate, a method for inserting a wound coil 41 directly into a core 2 having an open slot 3 is known as shown in FIG. 4. In this method, it is possible to increase the winding occupation rate in the slot 3. However, to realize the stator arranged as shown in FIG. 2, a rather long extra length is necessary so as to avoid mutual interference with the end coils.

The end coil portion of each coil of the stator exists only for the role for connecting the conductors entering the slots to each other but is not a portion for generating a magnetic field and allowing the motor to generate rotational torque. Therefore, the current flowing through this end coil portion is a useless current in a sense and a part of the copper loss for reducing the efficiency of the motor.

In every prior art mentioned above, there is a problem imposed that a long extra length is necessary in the end coil portion when a coil is inserted into each slot portion of the stator and as a result, the copper loss of the coil increases and the efficiency of the motor decreases.

SUMMARY OF THE INVENTION

An object of the present invention is to solve the aforementioned problems and to provide a rotary machine and a manufacturing method thereof for lowering the resistance of each coil by shortening the end coil portion, reducing the copper loss, and realizing improvement of efficiency and miniaturization.

To accomplish the above object, the present invention is characterized in that the coil end portion of a stator coil has a shape that a conductor raised and looped back from a slot provided in the core on the rotor side is closer to the end face of the aforementioned core than a conductor raised and looped back in the aforementioned slot on the opposite side of the rotor.

The present invention is also characterized in that the coil end portion of a stator coil has a shape that a conductor raised and looped back from a slot provided in the core on the rotor side is closer to the end face of the aforementioned core than a conductor raised and looped back in the aforementioned slot on the opposite side of the rotor and has a stator coil having a loopback shape passing a location other than above the adjacent slot surface.

The present invention is also characterized in that the aforementioned rotary machine is a motor. The present invention is also characterized in that the aforementioned rotary machine is a generator.

The present invention is also a method for manufacturing a rotary machine characterized in that the coil end portion of a stator coil is held horizontally by a holding member, and the holding member is rotated by finely moving the rotational center from the rotor side to the opposite side of the rotor with the slot insertion portion provided in the core restricted, and the aforementioned coil end portion is formed in the loopback shape.

The present invention is also a method for manufacturing stator coils arranged in many slots provided in the core three-dimensionally so as to be overlaid each other, wherein a system for winding a coil in lines using a mold and guide, bonding and fixing the coil wires, and then incorporating the coil into the core is used and by forming the end coil three-dimensionally, the end coil can be shaped so as to be incorporated into the core and can be made shortest. The end coil shape in this case is a loopback shape that a conductor rising in a slot portion from the inner diameter side of the core is close to the end face of the core in the end coil portion and a conductor inserted in the slot portion on the outer diameter side of the core passes a location farther from the end face of the core in the end coil portion.

BRIEF DESCRIPTION OF THE DRAWINGS

FIG. 2 is a drawing showing the coil arrangement of a stator of concentric winding, 3 phases, and 4 poles of an AC induction motor which is an embodiment of the rotary machine of the present invention.

FIG. 3a–3c are drawings showing a winding assembly of the conventional inserter system.

DETAILED DESCRIPTION OF THE PREFERRED EMBODIMENTS

The embodiments of the present invention will be explained with reference to the accompanying drawings.

A rotary machine such as a motor or a generator comprises a stator and a rotor. The stator is structured by inserting a plurality of coils three-dimensionally into the slot portion of an iron core and a core.

Next, as an embodiment of the present invention, in a stator coil comprising a multi-phase coil used in a motor such as an induction motor or a synchronous motor, a case of a coil of a structure that a plurality of coils are arranged and combined three-dimensionally in an iron core and a core will be explained.

Figure 1A:
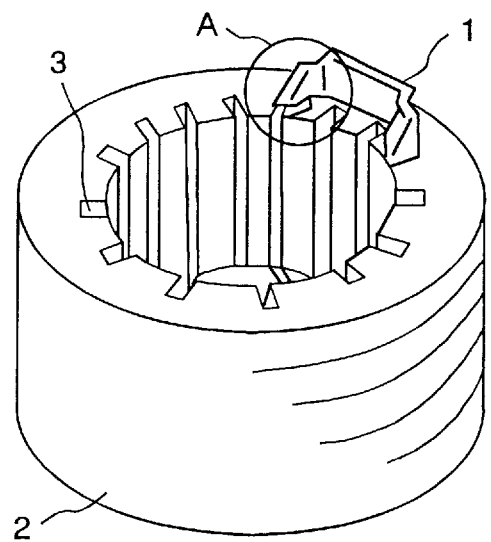
FIGS. 1a and 1b are drawings showing the shape of a stator and the rise portion of an end coil of an AC induction motor which is an embodiment of the rotary machine of the present invention.
Figure 1B:
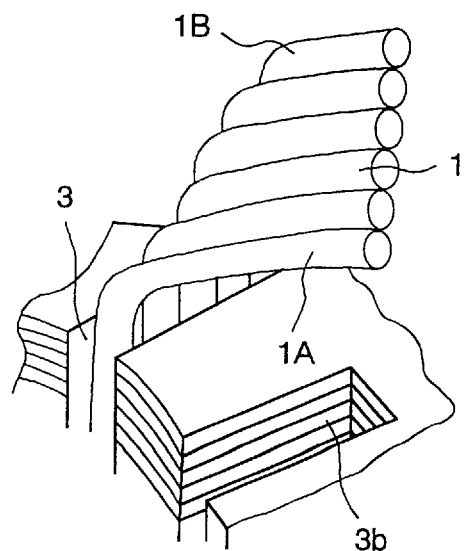

FIGS. 1a and 1b show the shape of a stator and the rise portion of an end coil of an AC induction motor of the present invention. The coil shape in the end portion of the present invention is formed as a loopback shape so that an inner side conductor (inner wire) 1A rising in a slot portion 3 on the inner diameter side for a core 2 is closer (closet in a best embodiment) to the end face of the core compared with an outer side conductor (outer wire) 1B rising in the slot portion 3 on the outer diameter side for the core 2 and the conductor 1B inserted in the slot portion 3 on the outer side for the core 2 passes a location in the end portion which is farther from the core and does not interrupt the core end of an adjacent slot portion 3b.

FIG. 2 shows an embodiment of the coil arrangement of a stator of concentric winding, 3 phases, and 4 poles of the present invention. The stator of the AC induction motor of the present invention comprises a core 2 of piled-up thin silicon steel plates and a coil 1 wound with a wire as shown in FIG. 1. The coil 1 has a role of generating a magnetic field for rotating the rotor and the portion protruding from the core 2 is called an end portion (end coil portion) and exists only for a role of connecting coil conductors entering the slot 3 to each other but is not a portion for supplying a current, generating a magnetic field, and producing rotational force of a motor. The coil 1 is structured so that sets of coils 4 outside and inside of a U-phase coil 1a indicated by a solid line shown in FIG. 2, a V-phase coil 1b indicated by a dashed line, and a W-phase coil 1c indicated by a dotted line are shifted and arranged by 30° respectively.

Next, an embodiment that the extra length of the end portion of a coil of the present invention is shortened, and the copper loss is reduced, and the efficiency of a motor is increased, and the end coil in each phase is prevented from interference will be explained by referring to FIGS. 5 to 10.

Figure 5A:
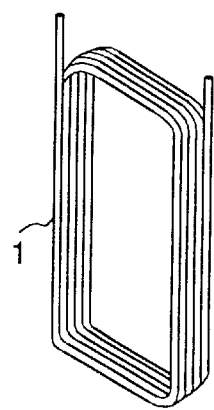
FIGS. 5a–5c are drawings showing the whole shape of an end coil of the loopback structure of the present invention.
Figure 5B:
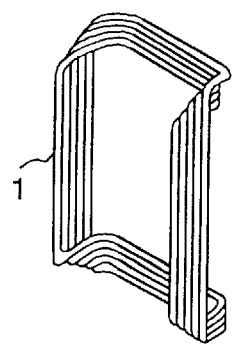
Figure 5C:
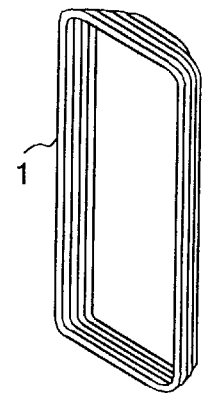

FIGS. 5a–5c show the wound coil shape and the coil shape formed by looping back the end portion of the present invention.

FIG. 5(a) shows the coil shape wound round a bobbin of the present invention. The coil shown in FIG. 5(a) is obtained by winding a wire round a bobbin having a section which is almost rectangular. To wind a wire in lines like this, it is desirable to wind the wire in a simple shape.

Figure 11A:
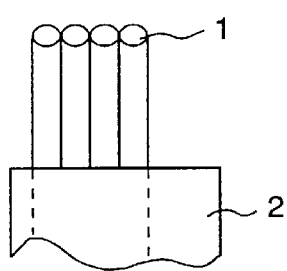
FIGS. 11a–11e are drawings showing the folding process of the coil end of the present invention.
Figure 11B:
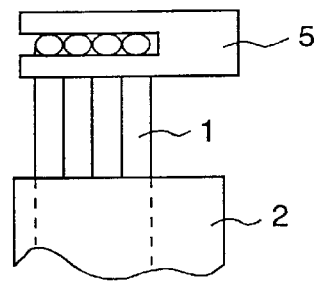
Figure 11C:
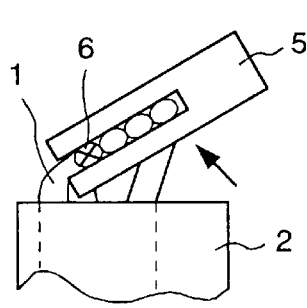
Figure 11D:
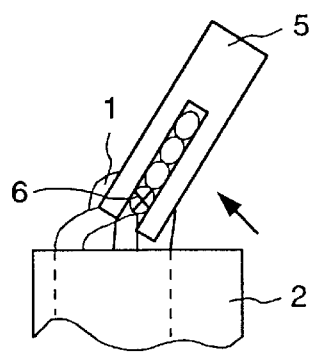
Figure 11E:
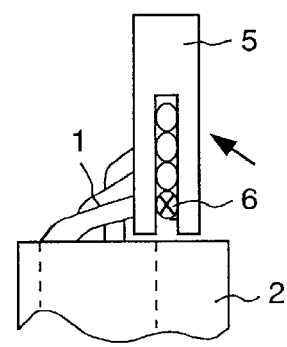

In this winding state that the wire is wound round the bobbin in lines, the bobbin of the end portion is removed in the state that the portion entering the slot portion is pressed against the bobbin by a pressing member so as to keep the wire away from scratch, and the end portions (upper and lower portions) on both sides are held by the chucks as shown in FIG. 11(b) so as to keep them away from scratch, and the fulcrum 6 of rotation is rotated from the rotor side to the opposite side of the rotor by slightly moving from the horizontal direction as shown in FIGS. 11(c), 11(d), and 11(e), and both end portions can be looped back so that the inner portion is bent inside the coil on the assumption that this side of FIG. 5(b) is the inside of the core. As a result, as shown in FIGS. 5(b) and 11(e), a coil in which the aforementioned two end portions are looped back can be obtained. In this case, in the end portions, an auxiliary bending mold is necessary for the portion entering the slot portion to the portion to be bent. When the wire shape is larger (thicker), since the inner radius of curvature when the wire is bent is different from the outer radius of curvature, a longer elongation of the wire is necessary for the portion of each end coil portion on the core side, that is, on the inner side of the core.

In a coil having a larger wire shape, to realize a shape that a wire is piled up vertically in the end coil portions, a method that, as shown in FIG. 5(c), a coil 1 in which a wire is wound longer round the peripheral length of the inner side using a quadrangular pyramid (trapezoid) bobbin is obtained and it is bent and deformed as explained above is effective.

Figure 4:
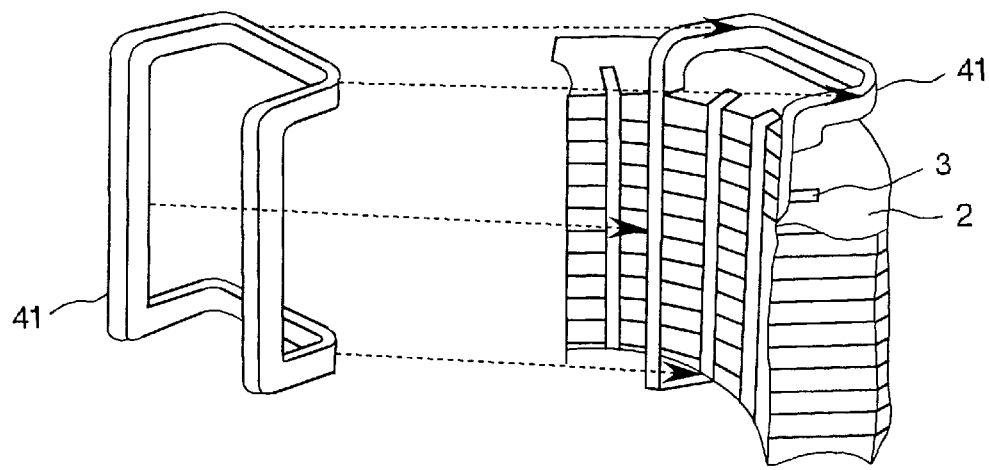
FIG. 4 is a drawing showing a method for incorporating a conventional wound coil into an open slot core.

When the coil prepared like this is removed from the bobbin and inserted into the slot portion by the method shown in FIG. 4, a coil having a shorter extra length of the end portion can be inserted into the slot portion free of interference.

The shape shown in FIG. 5(b) can be obtained also by removing the coil wound in FIGS. 5(a) and 5(b) from the bobbin and inserting it into the slot portion and then looping back the end portion by the same method as that mentioned above.

Figure 6A:
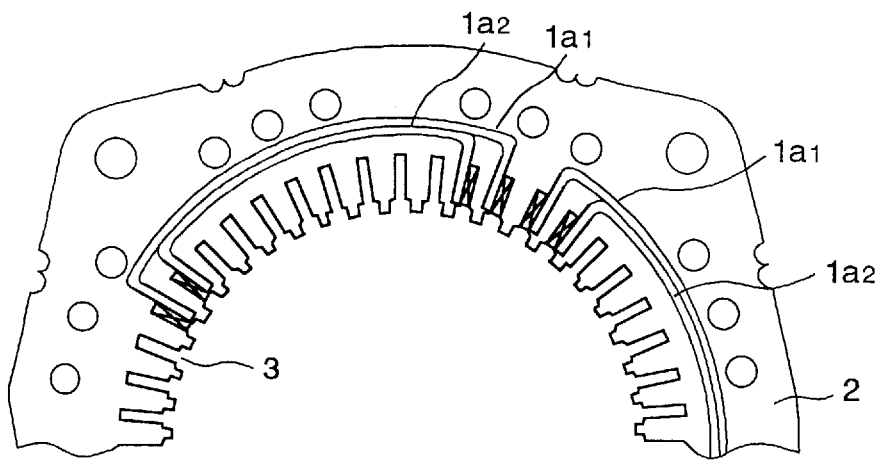
FIGS. 6a–6f are drawings showing the arrangement and shape of a U-phase coil of the present invention.
Figure 6B:
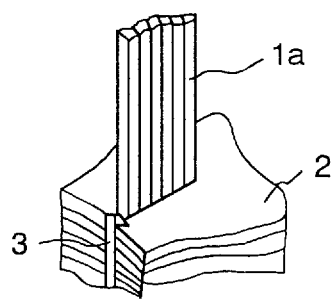
Figure 6C:
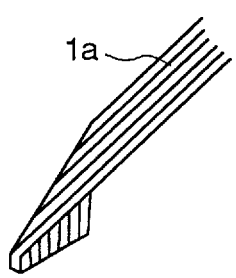
Figure 6D:
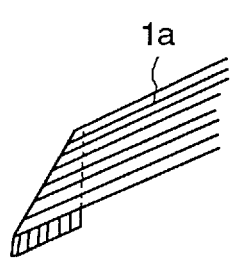
Figure 6E:
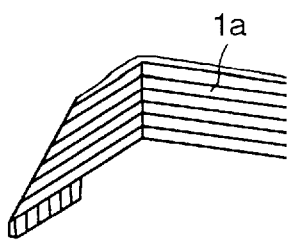
Figure 6F:
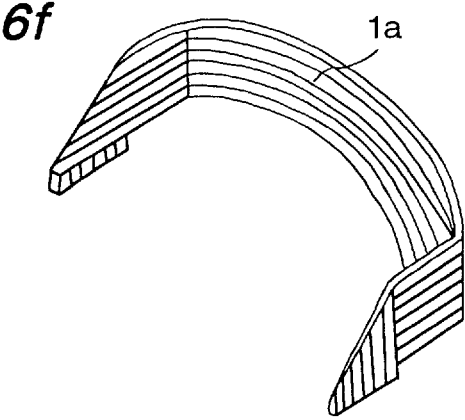

Next, the shape of an actual stator of the present invention for avoiding end coil interference will be explained. FIGS. 6a–6f show the shape of the U-phase coil 1a among the coils shown in FIG. 2. The coil 1a is shown as a member having a rectangular section. The conductor 1a rising as shown in FIG. 6(b) is of the loopback structure mentioned above as shown in FIGS. 6(c) to 6(e) and has the end coil shape shown in FIG. 6(f). The U-phase coil 1a has a structure, as shown in FIG. 6(a), that an outer U-phase coil 1a1 and an inner U-phase coil 1a2 are arranged and incorporated not so as to interrupt the adjacent slots 3.

Figure 7A:
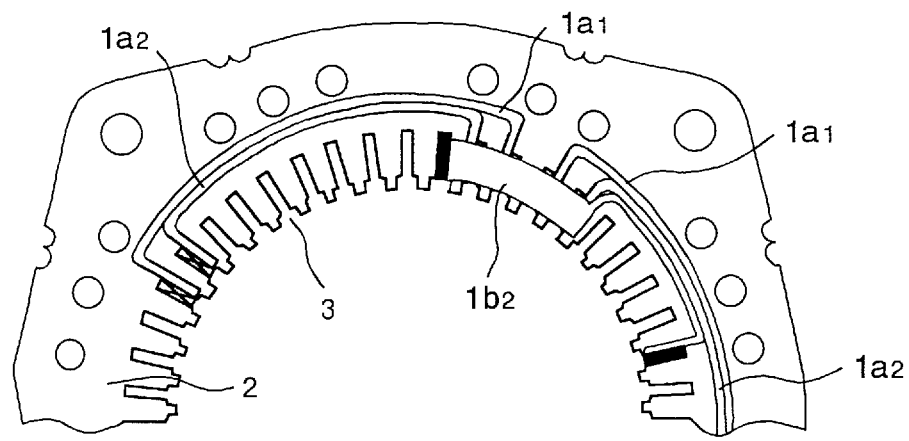
FIGS. 7a–7c are drawings showing the arrangement and shape of an inside V-phase coil of the present invention.
Figure 7B:
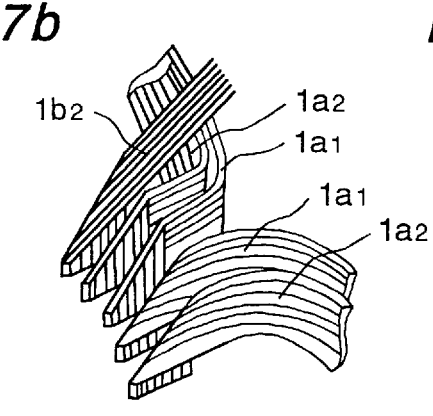
Figure 7C:
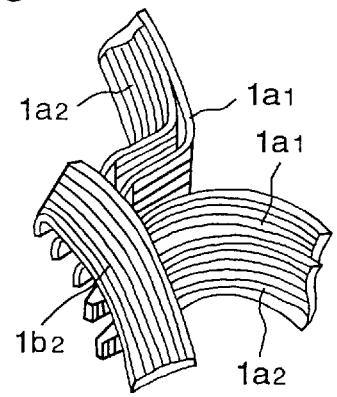
Figure 7D:
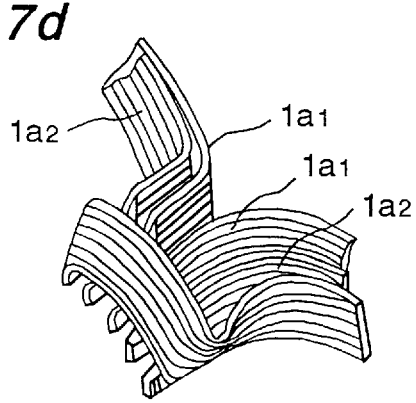
Figure 7E:
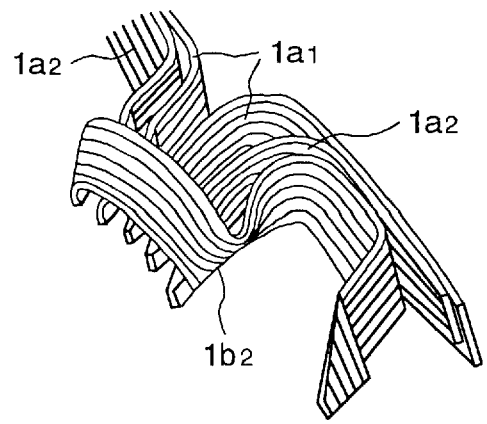

FIGS. 7a–7e show the shape of the inner V-phase coil 1b2 among the coils shown in FIG. 2. The inner V-phase coil 1b2 has a structure that the conductor rising from the slot 3 next to an inner U-phase coil 1a1 is bent so as to pass above the bent portion of the U-phase coil as shown in FIG. 7(b) and bent not so as to interrupt the adjacent slots 3 extending across the U-phase coil 1a as shown in FIGS. 7(c) and 7(d) and further has a structure that the conductor enters the predetermined slot 3 shown in FIG. 7(a) in the same loopback shape as that of the U-phase coil 1a as shown in FIG. 7(e).

Figure 8A:
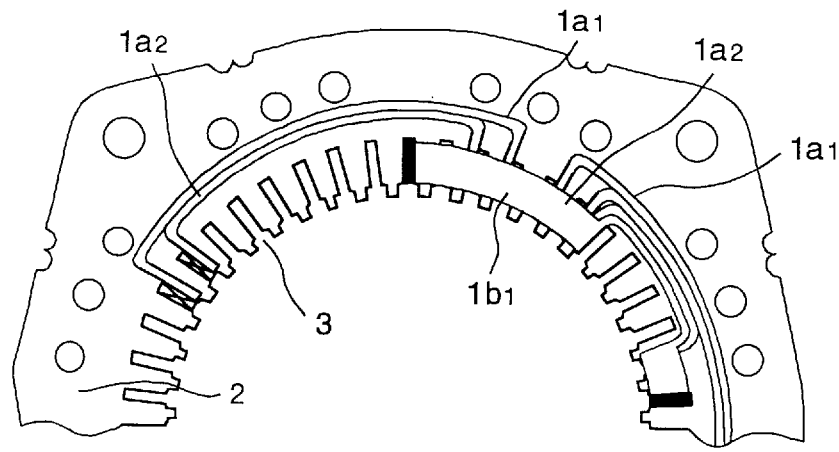
FIGS. 8a–8b are drawings showing the arrangement and shape of an outside V-phase coil of the present invention.
Figure 8B:
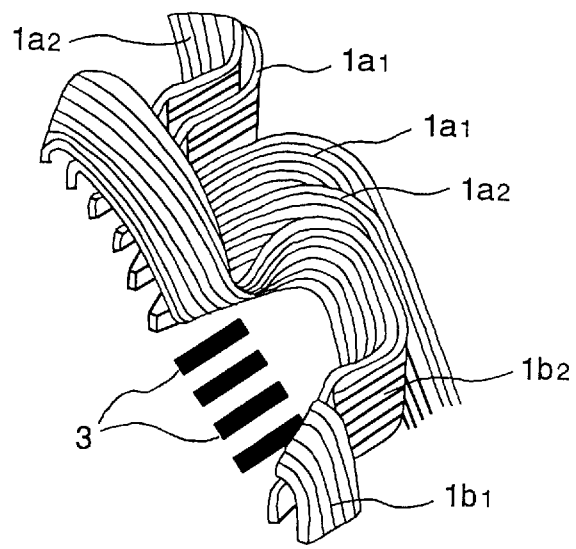

FIGS. 8a and 8b show the shape of the outer V-phase coil 1b1 among the coils shown in FIG. 2. The outer V-phase coil 1b1 has a structure that the conductor rising is from the slot 3 next to the inner V-phase coil 1b2 is bent so as to pass above the U-phase coil and the bent portion of the inner V-phase coil as shown in FIG. 8(b) and bent not so as to interrupt the adjacent slots 3 and further has a structure that the conductor enters the predetermined slot 3 shown in FIG. 8(*a*) crossing the inner V-phase coil 1*b*2.

Figure 9A:
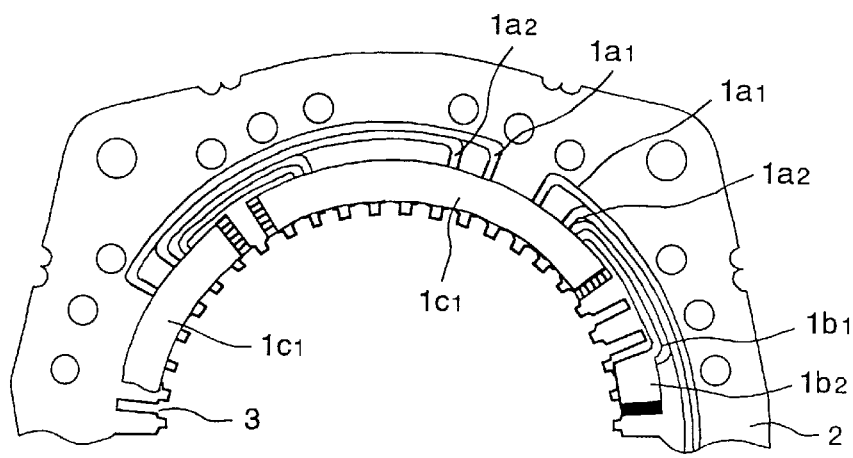
FIGS. 9a–9c are drawings showing the arrangement and shape of a W-phase coil of the present invention.
Figure 9B:
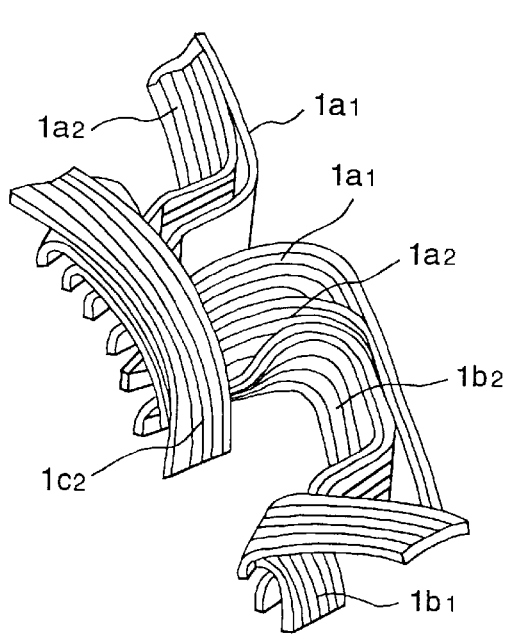
Figure 9C:
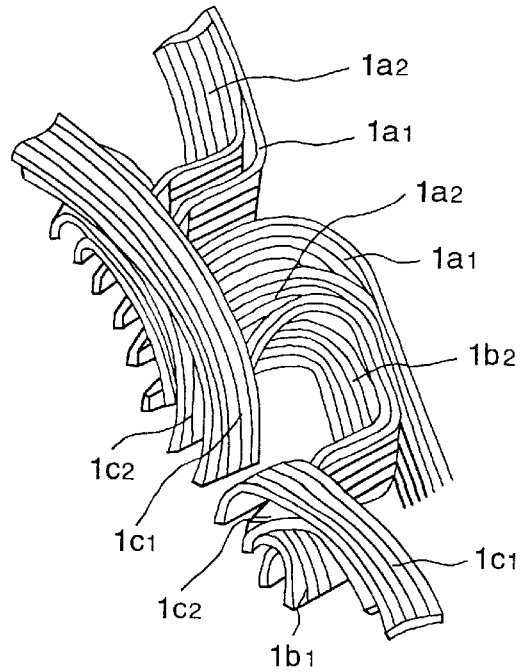
Figure 10:
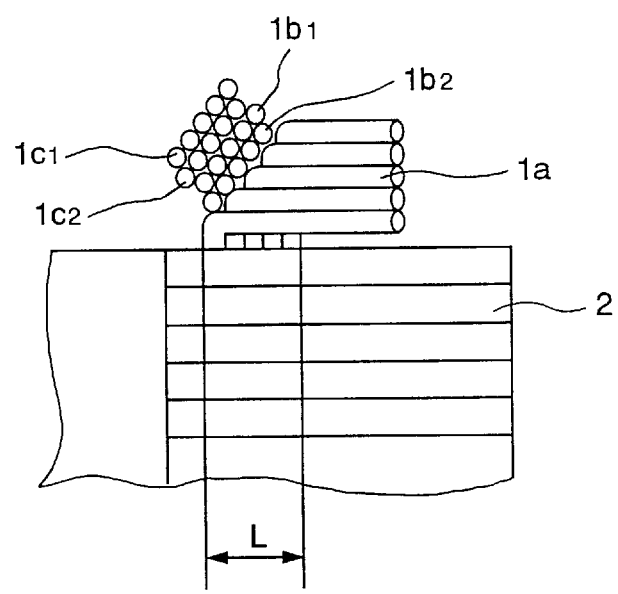
FIG. 10 is a drawing showing the section of the portion where all U, V, and W coils of the present invention overlay each other.

FIGS. 9*a*–9*c* show the shape of the W-phase coil 1*c* among the coils shown in FIG. 2. An inner W-phase coil 1*c*2 is arranged crossing over the U-phase and V-phase coils arranged so far. An outer W-phase coil 1*c*1 also has a structure that it enters the predetermined slot shown in FIG. 9(*a*) crossing over the U-phase coil 1*a*, the V-phase coil 1*b*, and the inner W-phase coil 1*c*2 arranged so far. The section of the location where all the coils overlay each other is shown in FIG. 10. The section shows a structure that the inner V-phase coil 1*b*2, the outer V-phase coil 1*b*1, the inner W-phase coil 1*c*2, and the outer W-phase coil 1*c*1 overlay each other obliquely on the location where the U-phase coil 1*a* is bent. By doing this, the height of the end coil portion is controlled to about 1.5 to 2 times of the slot length L of the coil, and miniaturization and reduction of the end coil portion can be realized, and furthermore miniaturization and improvement of efficiency of a motor itself are made possible.

The embodiments of the present invention are explained above using a 3-phase concentric winding stator. However, needless to say, this structure can be applied to lap winding or rotor winding.

According to the present invention, by shortening the end coil portion, the coil resistance can be reduced and by decreasing a useless current, the copper loss for lowering the efficiency of a rotary machine (for example, a motor) can be reduced. By doing this, the efficiency of a rotary machine (for example, a motor) can be improved. Furthermore, by miniaturizing the end coil portion itself, a rotary machine (for example, a motor) itself can be made smaller and the number of conductors to be used can be reduced, so that the material cost can be decreased. Furthermore, a motor among rotary machines is a key part of a set product, so that miniaturization, light weight, and low price of a set product using a motor can be realized.

We claim:

1. A rotary machine comprising:
   a stator having a stator core;
   a rotor; and
   a stator coil inserted into slots of said stator core, said stator coil including, in each slot, a Plurality of conductors aligned in a radial direction; wherein a coil end portion of said stator coil has a shape that one of said plurality of conductors raised and looped back from a slot provided in said stator core on the rotor side is closer to the end face of said stator core than another of said plurality of conductors raised and looped back in the slot on the opposite side of the rotor.

2. A rotary machine comprising:
   a stator having a stator core;
   a rotor; and
   a stator coil inserted into slots of said stator core, said stator coil including, in each slot, a plurality of conductors aligned in a radial direction; wherein a coil end portion of said stator coil has a shape that one of said plurality of conductors raised and looped back from a slot provided in said stator core on the rotor side is closer to the end face of said stator core than an other of said plurality of conductors raised and looped back in said slot on the opposite side of the rotor and has a loopback shape passing a location other than above the adjacent slot surface.

3. A rotary machine according to claim 1 or 2, wherein said rotary machine is a motor.

4. A rotary machine according to claim 1 or 2, wherein said rotary machine is a generator.

* * * * *